Nov. 13, 1928.  
L. L. DOLLINGER  
MEANS FOR CLEANING FILTERS  
Filed April 12, 1926   3 Sheets-Sheet 1

1,691,514

Inventor  
Lewis L. Dollinger  
By Frank Keijers  
Attorney

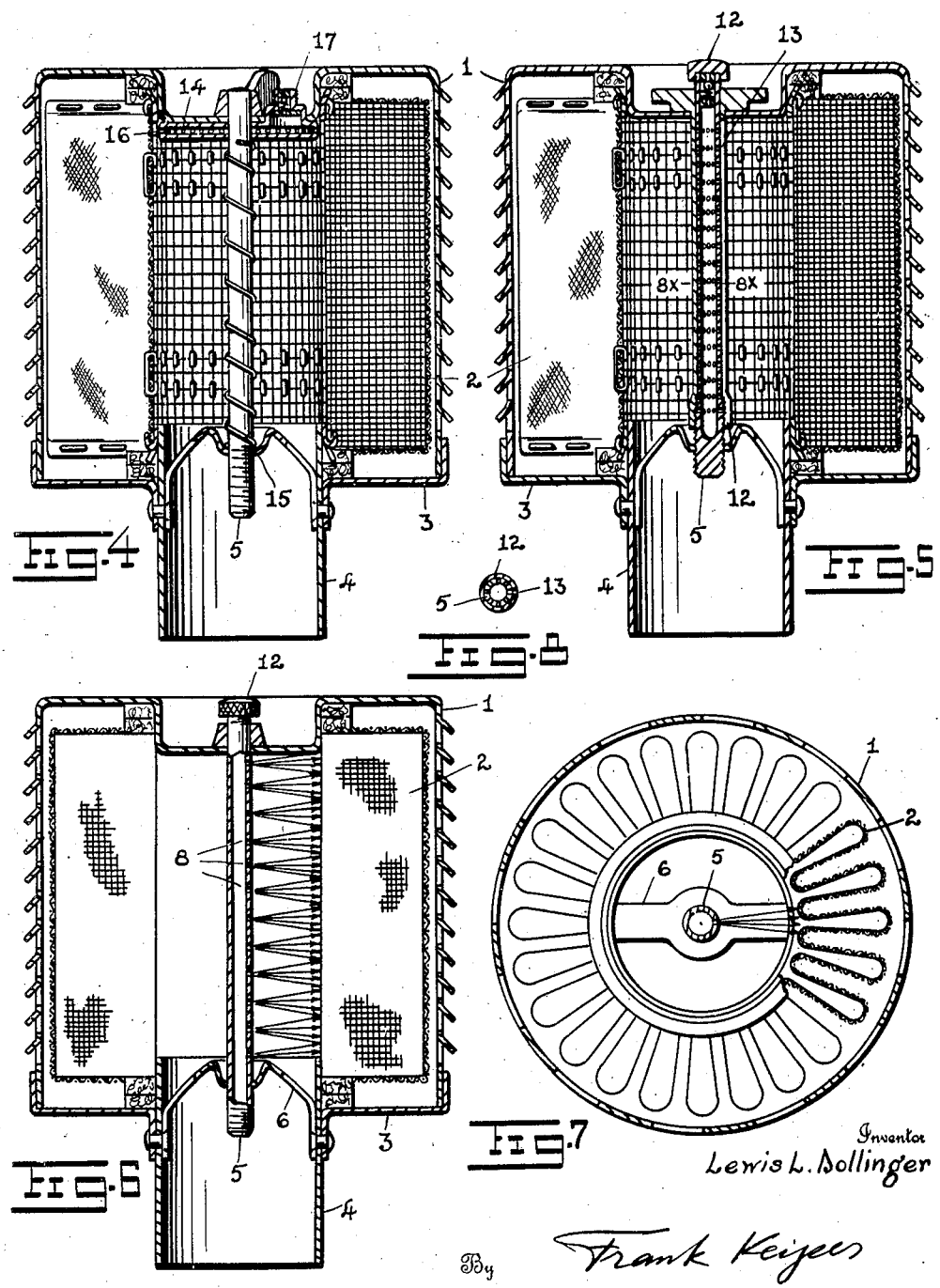

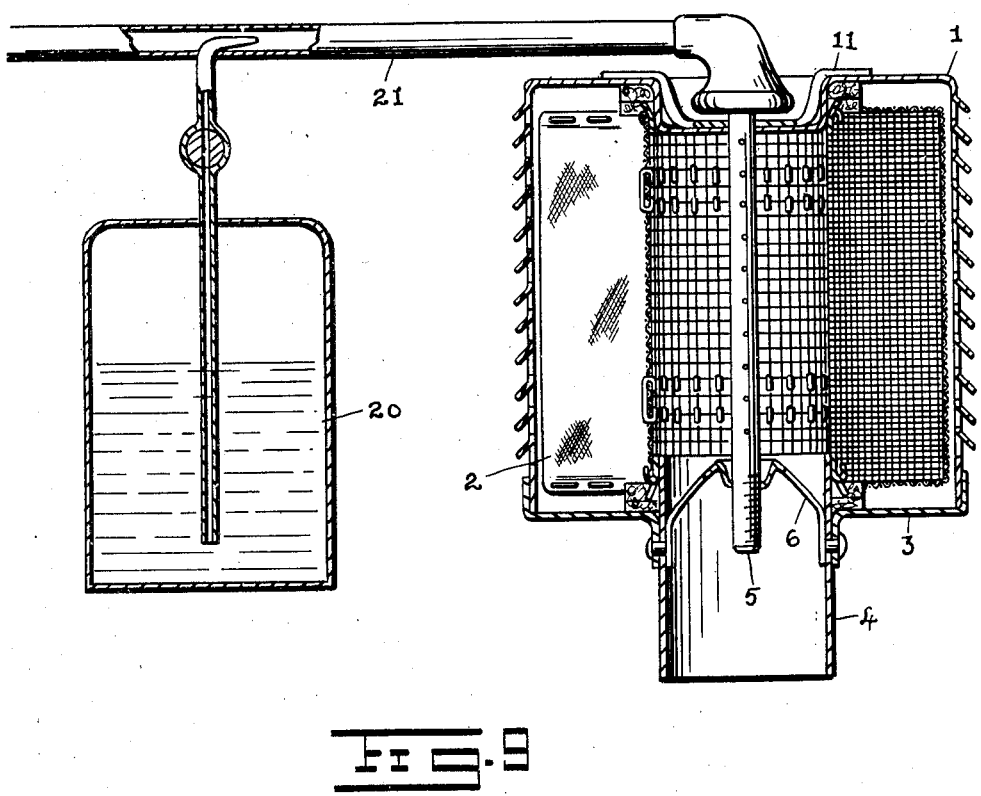

Patented Nov. 13, 1928.

1,691,514

UNITED STATES PATENT OFFICE.

LEWIS L. DOLLINGER, OF ROCHESTER, NEW YORK, ASSIGNOR TO STAYNEW FILTER CORPORATION, OF ROCHESTER, NEW YORK, A CORPORATION OF NEW YORK.

MEANS FOR CLEANING FILTERS.

Application filed April 12, 1926. Serial No. 101,294.

The object of this invention is to provide a new means for cleaning filters especially air filters used for purifying air.

These and other objects of this invention will be fully illustrated in the drawings, described in the specification and pointed out in the claims at the end thereof.

In the accompanying drawings;

Figures 4 and 5 are vertical sectional views of other modified forms of the cleaning means and the filters surrounding it.

Figures 6 and 7 are vertical and horizontal diagrammatic views of a filter and the filtering means.

Figure 8 is a horizontal sectional view of the cleaning bolt illustrated in Figure 5, the section being taken on the line 8×, 8× of Figure 5.

Figure 9 is a diagrammatic sectional view of a filter and its cleaning means combined with a liquid atomizer by means of which the air used for cleaning the filter can be charged with a cleaning fluid.

In the several figures of the drawings like reference numerals indicate like parts.

Figures 1, 2:
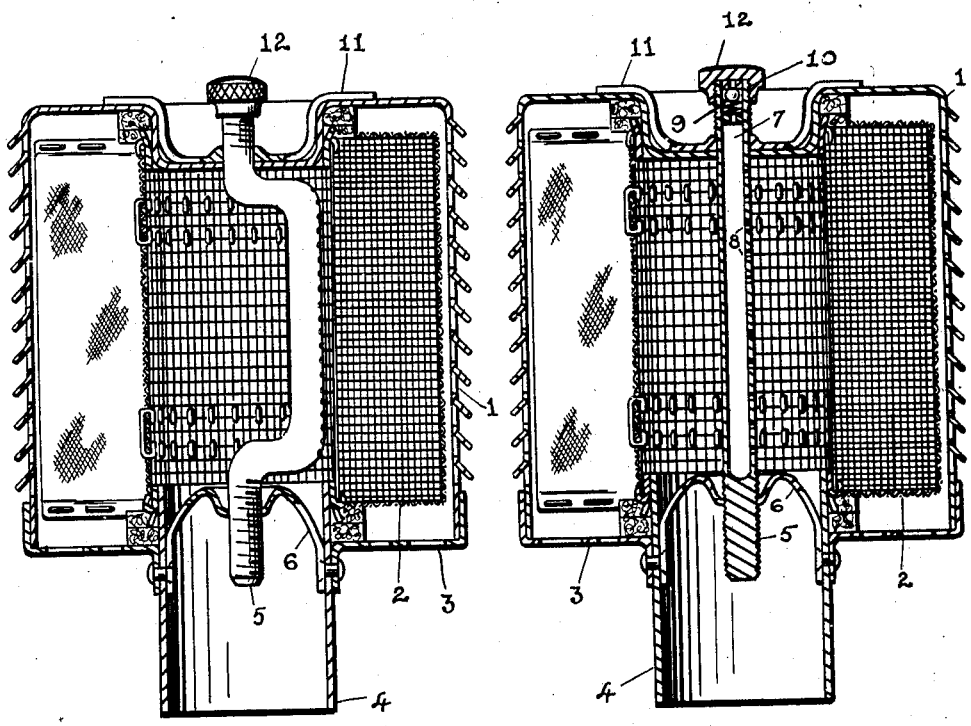
Figure 1 is a vertical sectional view of a filter provided with the new means for cleaning it.
Figure 2 is a similar view with a slightly modified form of the cleaning means.
Figure 3:
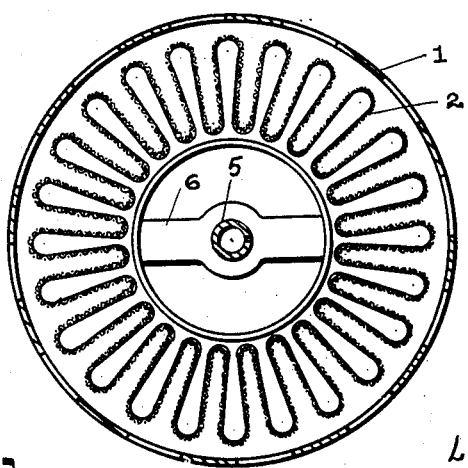
Figure 3 is a horizontal sectional view of the filter illustrated in Figure 2 and its means for cleaning it.

The means for cleaning filters forming the subject matter of my present invention are especially adapted for use in connection with an air filter such as is illustrated in my prior Patent 1,580,291 that will issue April 13, 1926. It is, however, understood that other filters can be cleaned equally as well by this same means and in illustrating my invention in connection with this type of filters I do not wish to confine this improved means of cleaning to this type of filters.

As illustrated in the figures, the filters in connection with which the cleaning means are illustrated comprise a cylindrical shell 1 having its wall perforated for the intake of the air. Within the cylindrical shell is mounted the filtering unit 2 comprising a series of radial pockets formed by filtering screen and covered with suitable filtering material.

The cylindrical shell of the filter is provided at the bottom with the removable head 3 in which the outlet 4 is located. The head 3 with the outlet is fastened to the shell by means of the draw bolt 5 which for this purpose is threaded into a suitable yoke 6 in the outlet 4. The outlet 4 extends into the open center of the filtering screen so that all the air drawn thru the shell 1 and filtered thru the filtering material into the inside of the radial pockets of the filtering unit passes thru this outlet.

The filtering area of the filtering unit and the intake into the shell surrounding the filtering unit is such that air drawn thru the filter impinges against the filtering material at a very low rate of speed so that any foreign matter separated from the air in passing thru the filtering material if at all only lightly adheres to the outside of the filtering unit. In time, however, the foreign matter adhering to the outside of the filtering unit begins to cover the filtering material and clog up the free passage of the air therethru. When this has happened it is desirable to remove foreign matter from the filtering unit to realize the full benefit of the filter and have it operate with its original low resistance.

Heretofore, the practice was to remove the filtering unit and clean it the best way possible, that is, knock off the dirt and grit on the outside and possibly wash it in a washing solution. To replace this slow and inefficient method, I provide the draw bolt 5 with a vertical duct 7 that is closed at the lower end and has a series of small outlets 8, 8 provided in the side of the bolt. In the open top of the bolt is provided the ball valve 9 that normally holds the inlet 10 of the bolt closed and prevents air from entering the filtering unit thru the bolt during the normal operation of the filter. The bolt has a suitable handle or wing nut 11 fastened thereto on the outside of the shell 1 so that it can be readily rotated therewith.

Ordinarily the draw bolt serves the function of holding the shell and filtering unit in place on the head or base 3. However, when it is desired to clean the filter this same bolt is utilized for that purpose as well. The cap 12 is removed from the top of the bolt and an air hose with the aid of a hose coupling is slipped over the end of the bolt in place of the cap. Air from a high pressure tank such as is in use in all gasoline filling stations for inflating pneumatic tires is then admitted thru the hose into the bolt while the bolt is slowly rotated making a complete revolution therewith. When air is forced into the bolt in this way it passes out thru the openings or outlets 8, 8 in the bolt at a very high velocity. The air thus forced out of the bolt spreads as it leaves the ducts as illustrated diagrammatically in Figures 6 and 7 and as the ducts 8, 8 are arranged in a vertical row in the bolt a stream of air is directed toward the pocket of the filtering unit opposite the ducts 8, 8 that completely covers the entrance into one pocket and directs the air into the pocket over its full length and width at a high velocity. As the velocity of the air thus impinging on the inside of the filtering material is much greater than the velocity of the air that has deposited the foreign matter on the outside of the filtering unit the air forced into the filter in this way quickly loosens the dirt and grit on the filtering material and blows it off. While the air is forced into the bolt the bolt is rotated so that the air from the ducts is progressively blown into each of the pockets of the filtering unit by the time the bolt has been given a complete turn.

The dirt and grit adhering to the filtering unit is thus blown off in a very short time and the filter reconditioned to its original efficiency and low resistance whenever necessary. The dirt blown off from the filtering unit drops down into the bottom of the shell 1 and out thru the openings in the head or base 3.

In Figure 1 I have illustrated the bolt as bent into a short yoke on the inside of the filtering unit in order to bring the outlet ducts in the side of the bolt close to the entrance of each of the pockets of the filtering unit.

In the modification illustrated in Figure 5 the bolt is provided with outlet ducts that cover the periphery of the bolt, that is, project in all directions the full length thereof. In this case the bolt is surrounded by a sleeve 12 having a vertical slot 18 provided in the side thereof. This sleeve can be rotated independently of the bolt so that when air is forced into the bolt, it can only pass out thru the ducts of the bolt that are uncovered by the vertical slot in the sleeve 12. On the rotation of the sleeve the air is progressively directed into each of the pockets of the filter in the same way as with the bolt illustrated in Figure 2.

In the modification illustrated in Figure 4 the air is not blown thru the bolt. Instead a circular flat casing 14 is mounted to slide on the bolt and normally held near the top of the bolt and against the underside of the filter housing by means of the expansion spring 15. In the periphery of this casing are provided the outlet ducts 16 and in the top of the casing is provided the intake 17. This intake projects thru the top of the filter housing and the air hose is attached to this intake by means of a suitable coupling. The casing is then depressed while air is admitted into it from the air hose. The air issuing from the outlet ducts is thus blown into all of the pockets of the filtering unit over their full length. When the casing has reached the bottom of the filtering unit it is released so that the spring 15 can return it to its normal position near the top of the bolt.

In Figure 9 I have illustrated a liquid atomizer 20 connected to the air line 21 used for the purpose of cleaning the filter. This atomizer contains a suitable cleaning fluid and charges the air with this cleaning fluid before it enters the inside of the filter. The combined cleaning fluid and the air then impinges on the inside of the filtering screen and foreign matter not otherwise readily displaced by the force of the air alone is dissolved either wholly or in part by the cleaning fluid, loosened from the filtering material and held in suspension so that the force of the air accompanying the cleaning fluid can completely blow it off.

It will of course be understood that any filter can be cleaned by the means heretofore described either with air alone or with air and a cleaning fluid combined whether it be an air, gas or liquid filter and such use is intended to be within the spirit of this invention.

I claim:

1. In a filter, the combination of a casing having an inlet, a continuous filtering screen mounted within said casing and having an outlet, a draw bolt projecting into said filtering screen from one end of said casing and adapted to clamp said filtering screen in place in said casing, an air duct in said draw bolt having an inlet at one end, an outlet in the side of said draw bolt, said draw bolt being adapted to be rotated to direct said outlets in said draw bolt progressively over sectional areas of the inside of the continuous filtering screen.

2. In a filter, the combination of a cylindrical casing having an inlet, a removable head at one end of said casing and having an outlet, a filtering screen within said casing and having an outlet registering with the outlet in said head, a draw bolt extending into said casing and said filtering screen to fasten said removable head and said filtering screen to said casing with the outlet in said filtering screen over said outlet in said removable head, an air duct in said draw bolt, an inlet in said air duct at one end of said draw bolt, an outlet in said draw bolt, said draw bolt being adapted to be rotated to progressively direct the outlet in said draw bolt over sectional areas of said filtering screen on the inside thereof.

3. In a filter, the combination of a cylindrical casing having an open and a closed end with openings in the side thereof, a base for said casing having an opening therein, a cylindrical filtering screen located within said casing, a hollow bolt having a threaded end projecting into the closed end of said casing and into said cylindrical filtering screen and threaded into said base to clamp said casing and said filtering screen in place on said base, said hollow bolt having its outer end open and having its side provided with an opening on the inside of said cylindrical filtering screen to permit air to be forced into the hollow bolt and thru the opening in the side thereof against the inside of said cylindrical filtering screen, the threads on said bolt being adapted to hold said bolt against endwise movement on the rotation thereof when directing air from the bolt against consecutive sections of the inside of the cylindrical filtering screen.

4. In a filter, the combination of a casing, a cylindrical filtering screen mounted within said casing, a hollow bolt projecting into said filtering screen, threads on the end of said hollow bolt adapted to hold said bolt against endwise movement within said filtering screen on the rotation thereof, said hollow bolt having an opening on the outside of said casing and an opening on the inside of said filtering screen adapted to have air pass therethru from the outside of the filter to be forced against the inside of said filtering screen while rotating said bolt.

In testimony whereof I affix my signature.

LEWIS L. DOLLINGER.